United States Patent [19]
Crowther et al.

[11] 3,892,780
[45] July 1, 1975

[54] PRODUCTION OF MALEIC ANHYDRIDE BY CATALYTIC VAPOR PHASE OXIDATION OF GLUTARIC ACID OR ANHYDRIDE

[75] Inventors: Alan Lewis Crowther; Christopher Buxton Spencer, both of Stockton-on-Tees, England

[73] Assignee: Imperial Chemical Industries Limited, London, England

[22] Filed: Sept. 25, 1972

[21] Appl. No.: 291,543

[30] Foreign Application Priority Data
Oct. 20, 1971 United Kingdom............... 48713/71

[52] U.S. Cl. ............................................. 260/346.8
[51] Int. Cl. ............................................ C07c 57/14
[58] Field of Search...... 260/346.8 A, 537 N, 537 R

[56] References Cited
UNITED STATES PATENTS

| | | | |
|---|---|---|---|
| 2,268,136 | 12/1941 | Drussbach | 260/537 |
| 2,316,543 | 4/1943 | Amend | 260/537 |
| 2,415,531 | 2/1947 | Porter | 260/346.8 |
| 2,474,334 | 6/1949 | Schmidl | 260/533 |

OTHER PUBLICATIONS

Slavinskaya et al., Chem. Abstracts, (1972), Vol. 76, 140415l.
Abstract of Geterogenryi Katal. Reakts. Poluch. Prevrashch. Geterosikl. Soedin 1971, pp. 25–33.
Agabekuv et al., Chem. Abstracts, (1969), Vol. 170, 77255, Abstract of Vesti Akad. Navuk Belarus SSR, Ser. Khim. Navuk 1968, (5) pp. 39–44.

*Primary Examiner*—Henry R. Jiles
*Assistant Examiner*—Bernard I. Dentz
*Attorney, Agent, or Firm*—Cushman, Darby & Cushman

[57] ABSTRACT

Maleic anhydride is produced by oxidising at elevated temperature a feedstock comprising glutaric acid or anhydride in the vapour phase by a gas-containing free oxygen, e.g. air, in the presence of a metal oxide catalyst.

9 Claims, No Drawings

PRODUCTION OF MALEIC ANHYDRIDE BY CATALYTIC VAPOR PHASE OXIDATION OF GLUTARIC ACID OR ANHYDRIDE

This invention relates to the production of maleic anhydride.

It is known to produce maleic anhydride by oxidising unsaturated hydrocarbons such as benzene and butenes in the presence of a catalyst. Many catalysts have been suggested for use in this process. Examples of such catalysts are those containing one or more oxides of vanadium, molybdenum, tungsten, phosphorus, titanium, tellurium, nickel, cobalt, silver and alkali metals, e.g. lithium.

We have now found that in this known oxidation process for the production of maleic anhydride the material to be oxidised may very suitably be glutaric acid or glutaric anhydride.

Thus, according to the invention there is provided a process for the production of maelic anhydride in which a mixture of a feedstock comprising glutaric acid and/or glutaric anhydride and a gas containing free oxygen is brought into contact in the vapour phase at elevated temperature with a solid catalyst comprising at least one metal oxide.

A wide range of feedstocks comprising glutaric acid and/or glutaric anhydride may be used. For example, the glutaric acid and/or glutaric anhydride may be substantially pure or mixed with one or more other organic compounds such as adipic acid, succinic acid and other lower aliphatic dicarboxylic acids or their anhydrides.

The feedstock may also contain water or water may be added to the feedstock. Water may help to effect vapourisation of the feedstock.

An important embodiment of the process of the invention is the production of maleic anhydride by the oxidation of mixture comprising glutaric, adipic and succinic acids which are by-products in the production of adipic acid by the oxidation of cyclohexane or its derivatives such as cyclohexanol and cyclohexanone. In this process for the production of adipic acid the crude oxidation product is worked-up to separate purified adipic acid from by-products comprising a mixture of glutaric, adipic and succinic acids. Adipic acid is an intermediate in the manufacture of nylon and is accordingly produced on a very large scale. It will be appreciated, therefore, that large tonnages of byproducts comprising glutaric, adipic and succinic acids are also produced and that the disposal of these byproducts presents a considerable problem to the nylon industry. It is, thus, an important advantage of the process of the invention that it provides a means of converting waste by-products which arise in the manufacture of nylon, into valuable maleic anhydride.

Before subjecting the by-product mixture comprising glutaric, adipic and succinic acids to the process of the invention it may be treated before or during vapourisation to remove some or all of any catalyst residues which it may contain.

The catalyst used in the process of the invention comprises at least one metal oxide. As already indicated the catalysts of the prior art may be used. Particularly suitable catalysts are those which are used commercially in the oxidation of benzene to maleic anhydride, especially those containing vanadium pentoxide. Very suitable catalysts are those which in addition to vanadium pentoxide also contain one or more of molybdenum oxide, phosphorus oxide or titania. The catalyst may also contain modifiers such as alkalies, e.g. lithium oxide and/or sulphate ions.

The catalyst may be carried on a support or it may be unsupported. Suitable supports are, for example, titania, ceramic materials, silicon carbide and especially alumina and/or silica. The catalyst may be used as a fixed bed or in the fluidised state.

The gas-containing free oxygen may very suitably be air or it may be oxygen or air diluted with another gas such as nitrogen or carbon dioxide which is inert under the reaction conditions.

Usually, the feedstock comprising glutaric acid and/or glutaric anhydride is brought into contact with the catalyst together with an excess of the gas-containing free oxygen over that required to oxidise the feedstock. Preferably but not essentially the mixture of the feedstock and the gas-containing free oxygen should be non-flammable.

The temperature at which the oxidation process of the invention is carried out is usually within the range 250° to 550°C, especially 300° to 500°C, and the time of contact of the reactants with the catalyst is normally not more than a few seconds. Any suitable pressure may be used including atmospheric or elevated pressure.

In the following Examples, illustrating the invention, the contact times were calculated on the basis of the total volume occupied by the catalyst and catalyst diluent and on the rate of flow of gas adjusted to the reaction temperature.

EXAMPLE 1

An aqueous solution of glutaric acid containing 13.2% glutaric acid was vapourised by passing it at a rate of 19 ml./hr. through a heated coil and then mixing the vapour with 21.7 litres/hr. of air. The mixture was then passed through a bed (38.5 ml.) of a catalyst supported on alumina and containing 9.8% vanadium pentoxide, 11.4% phosphorus pentoxide and 0.2% lithium. The catalyst bed was maintained at 440°C. The gases leaving the catalyst bed were scrubbed with water. Analysis of the resulting solution showed that the rate of production of maleic acid was 0.55 g./hr.

EXAMPLE 2

Air containing 0.6% by volume of glutaric anhydride vapour was passed through a tube packed with a mixture of 3 parts of an inert ceramic diluent and 1 part of a commercially available catalyst comprising oxides of vanadium and molybdenum (3.4% vanadium, 1.6% molybdenum) supported on alumina, containing a small amount of silica, having a surface area of about 2 m²/g. The temperature at the inlet to the catalyst bed was 400°C, the time of the contact with the bed was 1 second and the space velocity of the glutaric anhydride was 0.00115 moles/g. catalyst/hour. The conversion of the glutaric anhydride was virtually complete and the molar yield of maleic anhydride was 40 – 45%.

EXAMPLE 3

The experiment described in Example 2 was repeated in the absence of a catalyst diluent at 370°C and a contact time of 0.3 second using an inlet glutaric anhydride concentration in air of 1.6% corresponding to a space velocity of glutaric anhydride of 0.0031 moles/g. catalyst/hour. The conversion of glutaric anhydride was 82% and the molar yield of maleic anhydride was 45%.

EXAMPLE 4

Using the same conditions as described in Example 2, glutaric anhydride was oxidised over a catalyst comprising oxides of lithium, vanadium and phosphorus (0.13% lithium, 8.3% vanadium pentoxide and 7.8% phosphorus pentoxide) supported on alumina, containing a small amount of silica, having a surface area of about 0.1 m$^2$/g. The conversion of glutaric anhydride was 70% and the molar yield of maleic anhydride was 48%.

EXAMPLE 5

A reaction tube was packed with a mixture of 1 part of an inert ceramic diluent and a commercially available benzene oxidation catalyst comprising vanadium and molybdenum oxides supported on alumina, containing a small amount of silica, having a surface area of 2 m$^2$/g. (1.3% molybdenum, 4.4% vanadium,). Air containing 1.0% by volume of glutaric anhydride was passed through the tube. The contact time was 0.4 second, the space velocity of glutaric anhydride was 0.00352 moles/g. catalyst/hour and the temperature at the inlet to the catalyst bed was 370°C. The conversion of glutaric anhydride was 85% and the molar yield of maleic anhydride was 50%.

In further experiments air containing 2.5% glutaric anhydride together with steam was passed through the same packed reaction tube. The space velocity of glutaric anhydride was 0.0089 moles/g. catalyst/hour and the temperature at the inlet to the catalyst bed was 370°C. Neither the activity nor the selectivity of the catalyst were substantially affected at molar ratios of steam to glutaric anhydride of 5 : 1 or 10 : 1.

We claim:

1. A process for the production of maleic anhydride which comprises contacting a mixture of a feedstock comprising glutaric acid and/or glutaric anhydride and a gas-containing free oxygen in the vapour phase at elevated temperature with a solid vanadium oxide catalyst.

2. A process as claimed in claim 1 in which the feedstock also contains adipic and/or succinic acids or anhydrides.

3. A process as claimed in claim 1 in which the feedstock is a mixture of glutaric, adipic and succinic acids obtained by the oxidation of cyclohexane, cyclohexanol or cyclohexanone.

4. A process as claimed in claim 1 in which the solid catalyst also contains at least one of an oxide of molybdenum, phosphorus or titanium.

5. A process as claimed in claim 1 in which the catalyst is supported on alumina and/or silica.

6. A process as claimed in claim 1 in which the gas-containing free oxygen is air.

7. A process as claimed in claim 1 in which the elevated temperature is in the range of 300° to 500°C.

8. A process as claimed in claim 1 in which the contact time is in the range 0.1 to 5 seconds.

9. A process for the production of maleic anhydride which comprises contacting a mixture of a feedstock comprising glutaric acid and/or glutaric anhydride and a gas-containing free oxygen in the vapour phase at elevated temperature with a solid metal oxide catalyst consisting essentially of one or more oxides of vanadium, molybdenum, tungsten, phosphorus, titanium, tellurium, nickel, cobalt, silver and alkali metals.

* * * * *